US012250664B2

(12) United States Patent
Martin et al.

(10) Patent No.: US 12,250,664 B2
(45) Date of Patent: *Mar. 11, 2025

(54) FLEXIBLE MULTIPLEXING OF USERS WITH DIFFERENCE REQUIREMENTS IN A 5G FRAME STRUCTURE

(71) Applicant: Sony Group Corporation, Tokyo (JP)

(72) Inventors: Brian Alexander Martin, Basingstoke (GB); Martin Warwick Beale, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,639

(22) Filed: Sep. 29, 2023

(65) Prior Publication Data
US 2024/0040550 A1 Feb. 1, 2024

Related U.S. Application Data

(63) Continuation of application No. 17/732,584, filed on Apr. 29, 2022, now Pat. No. 11,805,498, which is a
(Continued)

(30) Foreign Application Priority Data

Aug. 11, 2015 (EP) .................................. 15180651

(51) Int. Cl.
H04W 72/04 (2023.01)
H04L 5/00 (2006.01)
(Continued)

(52) U.S. Cl.
CPC ......... H04W 72/044 (2013.01); H04L 5/0044 (2013.01); H04L 5/0058 (2013.01); H04W 16/32 (2013.01); H04W 72/51 (2023.01)

(58) Field of Classification Search
CPC .... H04L 5/0044; H04L 5/0058; H04W 16/32; H04W 72/044; H04W 72/048
See application file for complete search history.

(56) References Cited

U.S. PATENT DOCUMENTS 9,860,780 B2   1/2018 Beale
2008/0304581 A1* 12/2008 Bykovnikov ....... H04L 27/2626
                                                        375/260
(Continued)

FOREIGN PATENT DOCUMENTS

EP          2745450 A1    6/2014
WO    2012/104634 A1    8/2012
(Continued)

OTHER PUBLICATIONS

5GNOW Project Consortium: "5G Waveform Candidate Selection D3.1 Version 1.0", Nov. 21, 2013 (Nov. 21, 2013), XP055175081, Retrieved from the Internet: URL:http://www.5gnow.eu/system/files/5GNOW D3.1 v1.1 1.pdf [retrieved on Mar. 10, 2015].
(Continued)

Primary Examiner — Shukri Taha
(74) Attorney, Agent, or Firm — XSENSUS LLP

(57) ABSTRACT

A communications device configured to communicate in a wireless system having a wireless access interface providing communications resources arranged in time divided units of a host radio access technology, RAT, frequency bandwidth, the time divided units and the host RAT interface frequency bandwidth being arranged into one or more virtual RAT interfaces. The communications device configured to receive the signals transmitted via one of the virtual RAT interfaces in accordance with different communications parameters from the host RAT interface providing different characteristics for communicating data represented by the signals with respect to a characteristic of signals transmitted
(Continued)

according to communications parameters in the communications resources of the host RAT interface.

20 Claims, 9 Drawing Sheets

Related U.S. Application Data continuation of application No. 16/396,928, filed on Apr. 29, 2019, now Pat. No. 11,337,210, which is a continuation of application No. 15/743,431, filed as application No. PCT/EP2016/068276 on Aug. 1, 2016, now Pat. No. 10,314,033.

(51) Int. Cl.
*H04W 16/32* (2009.01)
*H04W 72/044* (2023.01)
*H04W 72/51* (2023.01)

(56) References Cited

U.S. PATENT DOCUMENTS

| | | | |
|---|---|---|---|
| 2012/0157109 A1* | 6/2012 | Li | H04W 28/20 455/450 |
| 2013/0176952 A1 | 7/2013 | Shin et al. | |
| 2013/0235814 A1 | 9/2013 | Wietfeldt et al. | |
| 2014/0010183 A1 | 1/2014 | McNamara et al. | |
| 2014/0269534 A1 | 9/2014 | Persson et al. | |
| 2014/0307698 A1 | 10/2014 | Beale | |
| 2015/0365945 A1 | 12/2015 | Morioka et al. | |
| 2016/0044694 A1 | 2/2016 | Park | |
| 2016/0157232 A1 | 6/2016 | Martin et al. | |
| 2017/0195028 A1 | 7/2017 | Shimezawa et al. | |
| 2019/0342897 A1 | 11/2019 | Yang et al. | |

FOREIGN PATENT DOCUMENTS

| | | |
|---|---|---|
| WO | 2012/104635 A1 | 8/2012 |
| WO | 2012/104644 A1 | 8/2012 |
| WO | 2012/172323 A1 | 12/2012 |
| WO | 2014/114920 A1 | 7/2014 |
| WO | 2015/022092 A1 | 2/2015 |

OTHER PUBLICATIONS

European Office Action dated Jun. 7, 2019, issued in corresponding European Patent Application No. 167507029.
Holma, et al., "LTE for UMTS: OFDMA and SC-FD MA Based Radio Access", Wiley 2009, ISBN 978-0-470-99401-6, Total 4 pages.
4G Americas, "4G Americas' Recommendations on 5G Requirements and Solutions," Oct. 2014, Total 40 pages.
Ericsson, "Ericsson Mobility Report on the Pulse of the Networked Society," Nov. 2014, Total 32 pages.
EV Hhi et al., 5 GNOW, "5G Waveform Candidate Selection", 03.1, "5GNOW_D3.1_v1.0.docx", Version: 1.0, Last Update: Nov. 21, 2013, Total 110 pages, XP055175081.
International Search Report and Written Opinion issued Nov. 8, 2016 in PCT/EP2016/068276 filed Aug. 1, 2016.

* cited by examiner

Example of different types of network nodes and devices in a 5G network

FLEXIBLE MULTIPLEXING OF USERS WITH DIFFERENCE REQUIREMENTS IN A 5G FRAME STRUCTURE

CROSS-REFERENCE TO RELATED APPLICATIONS

This application is a continuation of U.S. application Ser. No. 17/732,584, filed Apr. 29, 2022, which is a continuation of U.S. application Ser. No. 16/396,928, filed Apr. 29, 2019 (now U.S. Pat. No. 11,337,210), which is a continuation of U.S. application Ser. No. 15/743,431, filed Jan. 10, 2018 (now U.S. Pat. No. 10,314,033), which is based on PCT filing PCT/EP2016/068276, filed Aug. 1, 2016, and claims priority to EP 15180651.0, filed Aug. 11, 2015, the entire contents of each are incorporated herein by reference.

TECHNICAL FIELD OF THE DISCLOSURE

The present disclosure relates to communications devices configured to transmit data via a wireless communications network and to receive data from a wireless communications network, wherein the wireless communications network has been configured to provide wireless communications in accordance with different communications parameters. In some embodiments the wireless access interface is configured to provide support for communications from different types of devices. The present invention also relates to methods of communicating using communications devices, wireless communications network, infrastructure equipment and methods.

BACKGROUND OF THE DISCLOSURE

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication devices, devices which require little or no mobility, high resolution video displays and virtual reality headsets. As such, supporting such a wide range of communications devices can represent a technical challenge for a wireless communications network.

SUMMARY OF THE DISCLOSURE

According to a first aspect of the present disclosure there is provided a communications device for transmitting data to or receiving data from a wireless communications network. The communications device comprises a transmitter configured to transmit signals to one or more infrastructure equipment of the wireless communications network via a wireless access interface, a receiver configured to receive signals from one or more of the infrastructure equipment of the wireless communications network via the wireless access interface, and a controller. The controller is configured to control the transmitter and the receiver to transmit the signals to and to receive the signals from the infrastructure equipment via the wireless access interface. The wireless access interface provides communications resources arranged in time divided units of a host radio access technology (RAT) interface frequency bandwidth, the time divided units and the host RAT interface frequency bandwidth being arranged into one or more virtual RAT interfaces. The receiver is configured to receive the signals transmitted via one of the virtual RAT interfaces in accordance with different communications parameters from the host RAT interface providing different characteristics for communicating data represented by the signals with respect to a characteristic of signals transmitted according to communications parameters in the communications resources of the host RAT interface.

Embodiments of the present technique can therefore provide a wireless access interface which is configured with one or more virtual radio access technology (RAT) interfaces within a host RAT interface of a wireless communications network, which can support different types of communications devices.

Embodiments of the present technique can provide an arrangement in which a wireless access interface provided by a host mobile communications network is configured to allocate those physical communications resources to provide different radio access techniques to different types of devices. According to the present technique, a communications network configures predetermined physical resources which may be regarded as virtual RAT interfaces to provide different communications parameters for different types of communications for different devices. Accordingly, a heterogeneous arrangement is provided for communications resources available with any host system which can be more applicable to some devices, not others. As such, embodiments of the present technique can be arranged to provide parameterisation of radio resources according to service requirements, while sharing the same physical resources, as well as flexibility in the network configurations, allowing for near or substantially optimised parameterisation depending on the service, device, and network types.

Various further aspects and embodiments of the disclosure are provided in the appended claims, including but not limited to, a communications device, infrastructure equipment, mobile communications system and a method of communicating.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Development of Wireless Communications Networks

As explained above, wireless communications networks continue to evolve to meet more diverse requirements for different types of communications devices. Whilst third and fourth generation systems have been arranged to increase a data communications bandwidth for communications devices, it has been recognised that not all types of devices require high data rates. The 3GPP will start standardisation of a new 5G radio access technology within the next few years. The aim of 5G is not only mobile connectivity for people, but to provide ubiquitous connectivity for any type of device and any type of application that would benefit from being connected. Many requirements and use-cases are still being discussed, these include:

Low latency transmission of data
Very high data rates
Millimetre wave spectrum
High density of network nodes providing small cells and relays
Large system capacity
Massive number of devices (e.g. MTC devices)
High reliability especially for mission critical devices such as vehicle safety.
Low device cost and energy consumption
Flexible spectrum usage
Flexible mobility, catering for highly mobile devices as well as devices which will be static.

Figure 1:
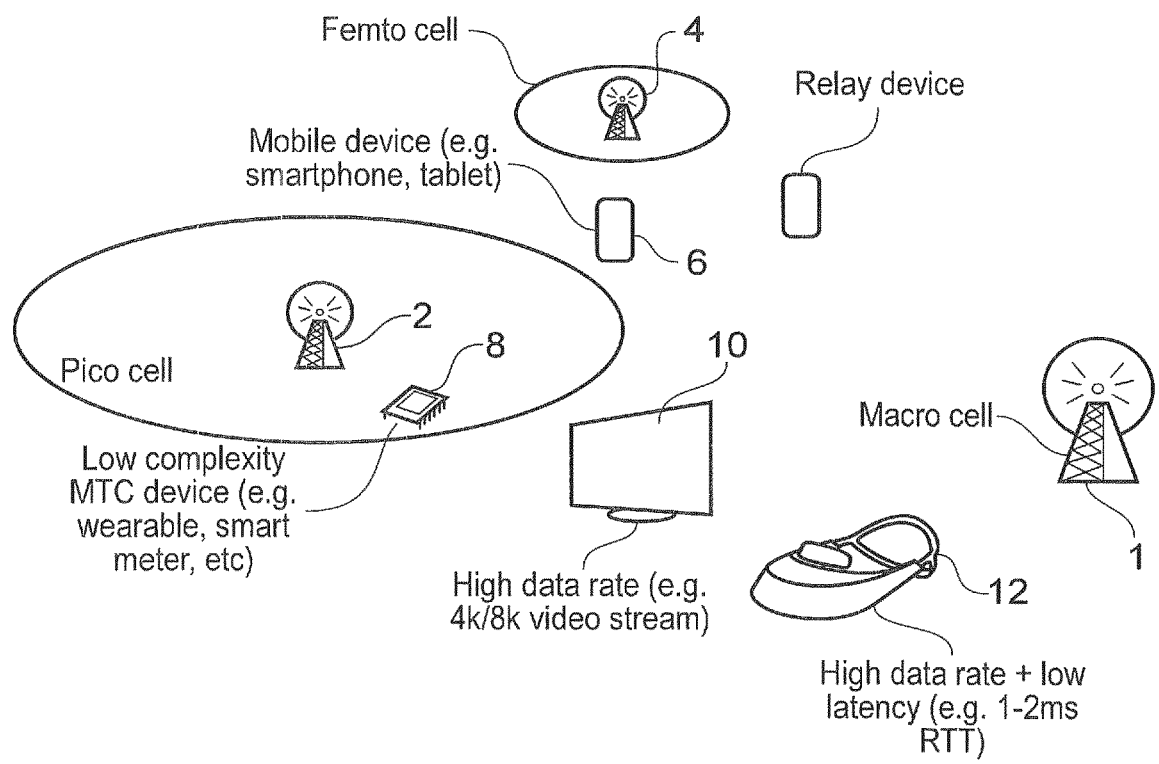
FIG. 1 provides a schematic representation of communications system which provides wireless data communications to different types of communications devices using different types of infrastructure of a mobile communications network.

A more comprehensive summary of requirements and use-cases may be provided from [2] and [3]. FIG. 1 provides an example illustration of a future mobile communications system in which a plurality of different types of devices is used. As shown in FIG. 1, a first base station 1 may be provided to a large cell or macro cell in which the transmission of the signals is over several kilometres. However the system may also support transmission via a very small cell such as transmitted by a second infrastructure equipment 2 which transmits and receives signals over a distance of hundreds of metres thereby forming a so called "Pico" cell. In contrast a third type of infrastructure equipment 4 may transmit and receive signals over a distance of tens of metres and therefore can be used to form a so called "Femto" cell.

Also shown in FIG. 1, different types of communications devices may be used to transmit and receive signals via the different types of infrastructure equipment 1, 2, 4 and the communication of data may be adapted in accordance with the different types of infrastructure equipment using different communications parameters. It is expected that in the future many types of devices may communicate via a mobile communications system. Conventionally a mobile communications device may be configured to communicate data to and from a mobile communications network via the available communication resources of the network. Typically the wireless access system is configured to provide the highest data rates to devices such as smart phones 6. However in the future a so called "internet of things" may be provided in which low power machine type communications devices transmit and receive data at very low power, low bandwidth and may have a low complexity. An example of such a machine type communication device 8 may communicate via a Pico cell 2. In contrast a very high data rate and a low mobility may be characteristic of communications with, for example, a television 10 which may be communicating via a Pico cell. Similarly a very high data rate and low latency may be required by a virtual reality headset 12.

As will be appreciated from the example shown in FIG. 1 there may therefore be a plurality of different types of devices with different data rate and latency requirements for the transmitted data. Accordingly, the embodiments of the present technique can provide an arrangement in which available physical resources of a wireless access interface are subdivided in frequency and time into different portions, each portion being arranged so that data may be represented as different types of signal waveforms within those physical resources so that the transmission of the data within those physical resources is matched to the type of application for which those mobile devices are configured.

As will be appreciated therefore there is a requirement to provide a wireless communications network with a wireless access interface which can cater for and support communications of a variety of different types. The problem is how to enable different types of communications devices with completely different requirements such as high or low data rate, different latency requirements, different priorities such as power consumption vs. throughput, etc, and how to accommodate these different types of device and service as well as different types of network node within a single radio interface. Furthermore it is expected that "network slicing" will be required, which means that different service providers (operators) may be able to share the same infrastructure equipment while serving different types of device or providing different quality of service.

The present technique provides an arrangement for allowing data to be communicated with different communications parameters and different types of communications to be supported for different applications and devices via a wireless access interface with a common framework. According to the present technique therefore the communications resources of the host RAT interface are configured differently according to the application to which they are directed. In one example, the host communications interface may be configured in accordance with a 3GPP defined Long Term Evolution (LTE) standard. As such in order to appreciate advantages and aspects provided by embodiments of the present technique a wireless communications system configured in accordance with the LTE standard will first be described.

Conventional LTE Network

Figure 2:
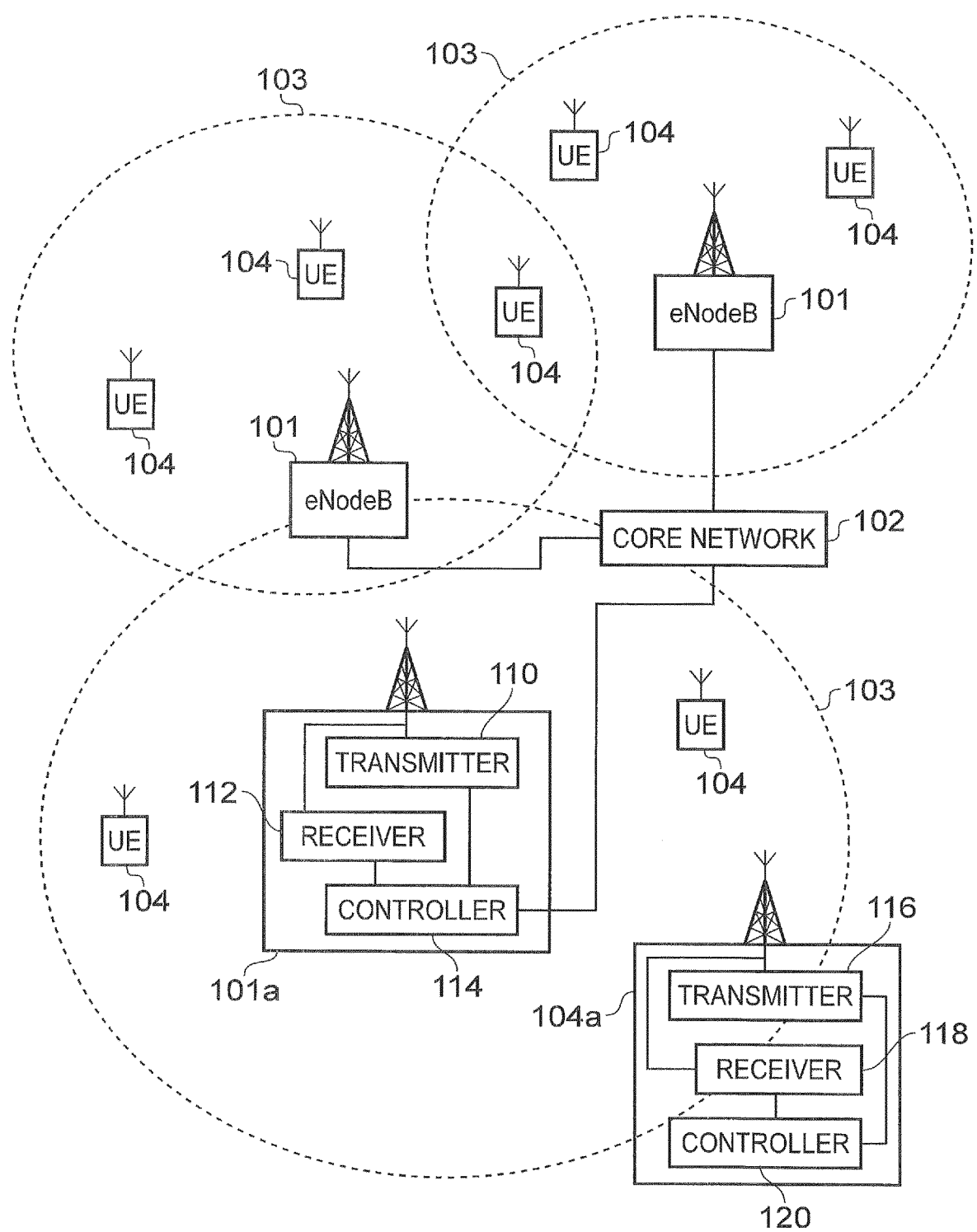
FIG. 2 provides a schematic diagram illustrating an example of a conventional mobile communications system.

FIG. 2 provides a schematic diagram illustrating some basic functionality of a mobile telecommunications network/system operating in accordance with LTE principles. Various elements of FIG. 2 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The mobile telecommunications system, where the system shown in FIG. 2 includes infrastructure equipment comprising base stations 101 which are connected to a core network 102, which operates in accordance with a conventional arrangement which will be understood by those acquainted with communications technology. The infrastructure equipment 101 may also be referred to as a base station, network element, enhanced NodeB (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 2 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

As shown in FIG. 2, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and a downlink.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. The transmitter 116 and the receiver 118 are controlled by a controller 120.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 3 and 4.

Figure 3:
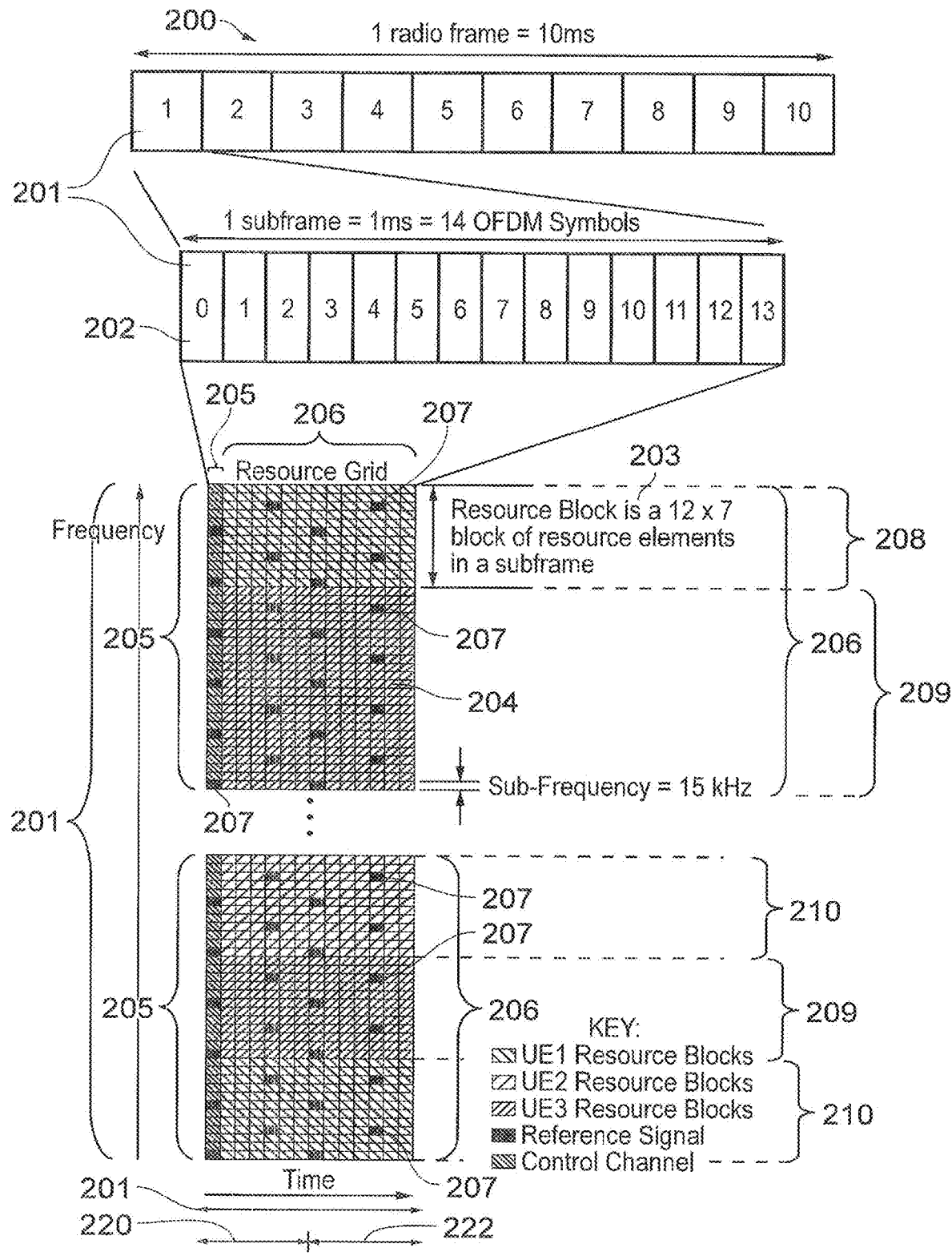
FIG. 3 provides a schematic diagram of a structure of a downlink of a wireless access interface of a mobile communications system operating according to an LTE standard.

FIG. 3 provides a simplified schematic diagram of the structure of a downlink of a wireless access interface that may be provided by or in association with the eNodeB of FIG. 2 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 3, the resources of the wireless access interface are also temporally divided into frames where a frame 200 lasts 10 ms and is subdivided into 10 sub-frames 201 each within a duration of 1 ms. Each sub-frame 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. The resource elements distributed in time within a sub-frame and frequency across the host system band width represent the communications resources of the host system.

The simplified structure of the downlink of an LTE wireless access interface presented in FIG. 2, also includes an illustration of each sub-frame 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 3, UE1 has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

Figure 4:
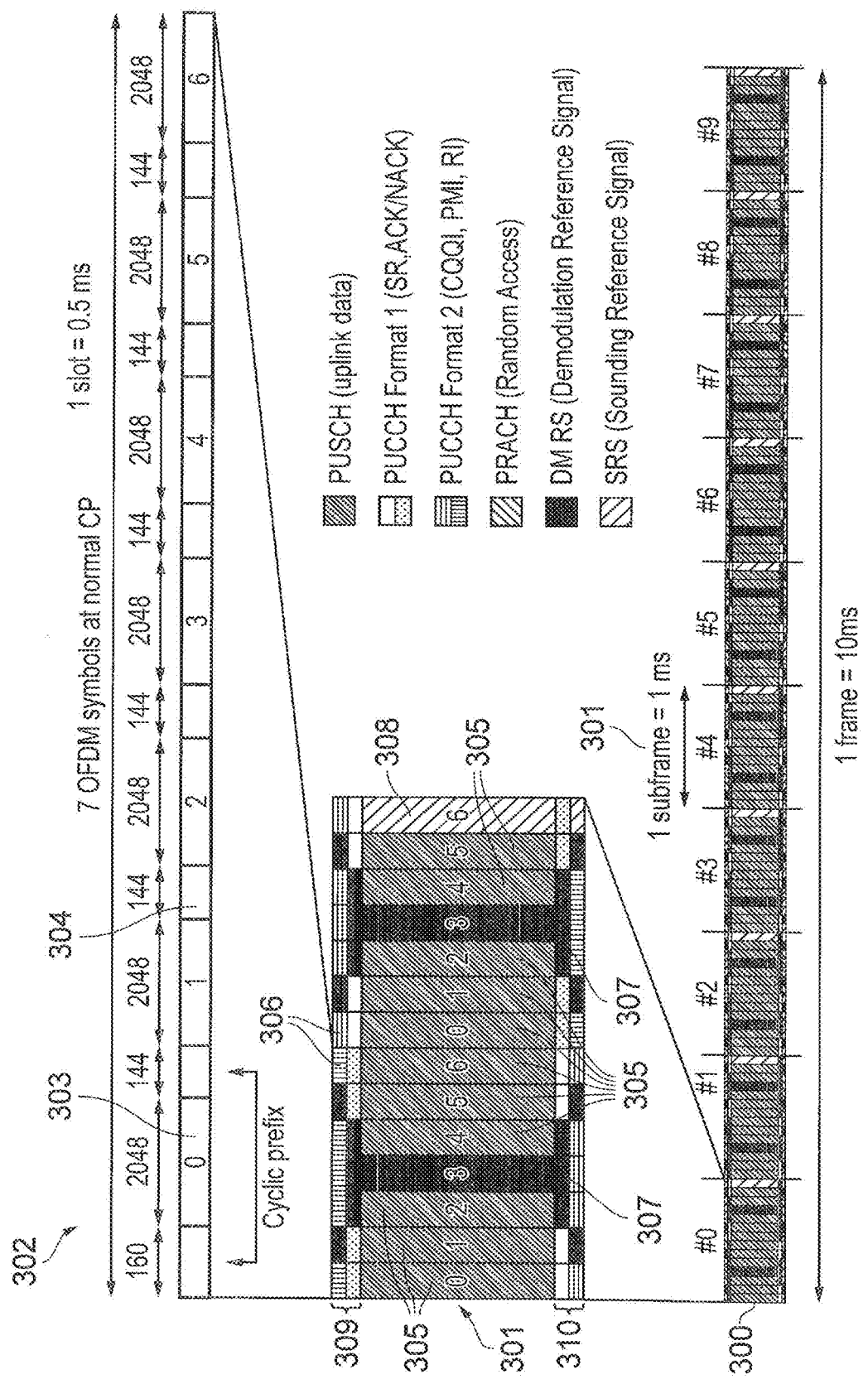
FIG. 4 provides a schematic diagram of an uplink of a wireless access interface of a mobile communications system operating according to an LTE standard.

FIG. 4 provides a simplified schematic diagram of the structure of an uplink of an LTE wireless access interface that may be provided by or in association with the eNodeB of FIG. 2. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 4 illustrates such an uplink frame in an FDD implementation. A frame 300 is divided in to 10 sub-frames 301 of 1 ms duration where each sub-frame 301 comprises two slots 302 of 0.5 ms duration. Each slot is then formed from seven OFDM symbols 303 where a cyclic prefix 304 is inserted between each symbol in a manner equivalent to that in downlink sub-frames. More details of the LTE up-link represented in FIG. 4 are provided in Annex 1.

Virtual Carrier

As explained above and as will be explained in the more detail in the next section, embodiments of the present technique can provide a wireless access interface in which one or more virtual RAT interfaces are provided within a host wireless access interface. In order to appreciate advantages and applications of embodiments of the present technique, an explanation will now be provided in this section of our previously proposed virtual carrier concept so that a better understanding can be gained from the description of the example embodiments below.

In conventional mobile telecommunication networks, data is typically transmitted from the network to the mobile devices in a frequency carrier (first frequency range) where at least part of the data spans substantially the whole of the bandwidth of the frequency carrier. Normally a mobile device cannot operate within the network unless it can receive and decode data spanning the entire frequency carrier, i.e. a maximum system bandwidth defined by a given telecommunication standard, and therefore the use of mobile devices with reduced bandwidth capability transceiver units is precluded. However, as disclosed in co-pending International patent applications numbered PCT/GB2012/050213, PCT/GB2012/050214, PCT/GB2012/050223 and PCT/GB2012/051326, the contents of which are herein incorporated by reference, a subset of the communications resource elements comprising a conventional carrier (a "host carrier") are defined as a "virtual carrier", where the host carrier has a certain bandwidth (first frequency range) and where the virtual carrier has a reduced bandwidth (second frequency range) compared to the host carrier's bandwidth. A virtual carrier can, therefore provide a facility for devices having a reduced capability or complexity (reduced capability devices) to receive data separately transmitted on the virtual carrier set of communications resource elements. Accordingly, data transmitted on the virtual carrier can be received and decoded using a reduced complexity or capability transceiver unit.

Figure 5:
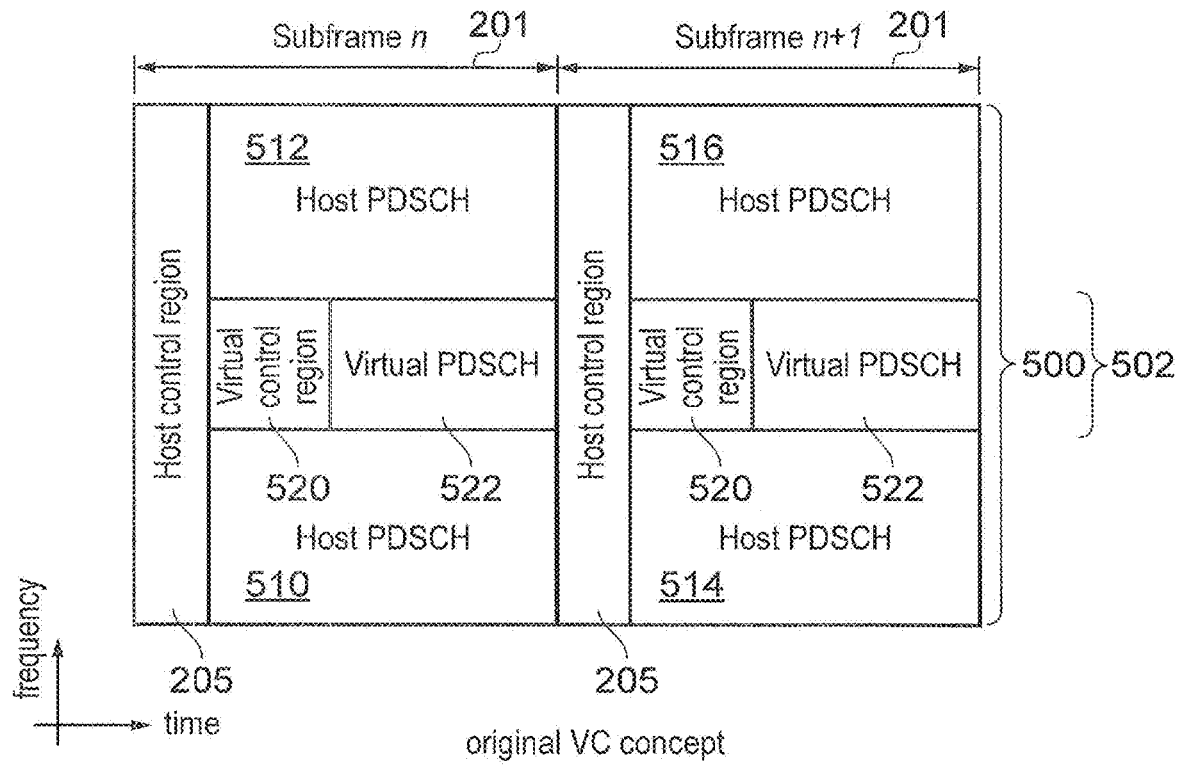
FIG. 5 provides a schematic diagram illustrating an example of an LTE downlink wireless access interface, which includes a two example sub-frames illustration of a previously proposed control channel arrangement.

An example of a virtual carrier arrangement according to the abovementioned previous disclosures is presented in FIG. 5. FIG. 5 represents a simplified representation of the downlink of the wireless access interface shown in FIG. 3 in order to illustrate the virtual carrier concept. Therefore the same reference numerals have been given to corresponding features of the diagram in FIG. 5 for corresponding features in FIG. 3. As shown in FIG. 5, two sub-frames as shown 201 which are sub-frame n and sub-frame n+1. As explained above, within each successive sub-frame within a predetermined bandwidth of the host system there is provided a plurality of communications resources within the host bandwidth 500. However in accordance with the virtual carrier concept a predetermined set of physical resources within a virtual carrier bandwidth 502 is provided for downlink communications when transmitting to MTC type devices. The remaining part of the physical resources within the host carrier bandwidth 500 is available to conventional devices. In accordance with the conventional operation any of the UE's which are transmitting and receiving data via the wireless access interface can receive control channel messages via the host control region 205 which allocate communications resources within the host downlink shared channel 510, 512, 514, 516. In contrast in accordance with a conventional virtual carrier operation, the virtual carrier within the reduced bandwidth 502 comprises a control channel region 520 and a virtual downlink shared channel 522. Thus reflecting the arrangement for the host carrier, in which control channel messages are transmitted within the host control region 205 allocating resources within the host downlink shared channel 510, 512, 514, 516 a control message is transmitted within the virtual control region 520 which allocates communications resources to the MTC devices communicating via the virtual carrier within the virtual downlink shared channel 522. Accordingly, the virtual carrier exists within the host carrier and is dedicated for communicating data to reduced capability or MTC type devices via a reduced bandwidth 502.

Figure 6:
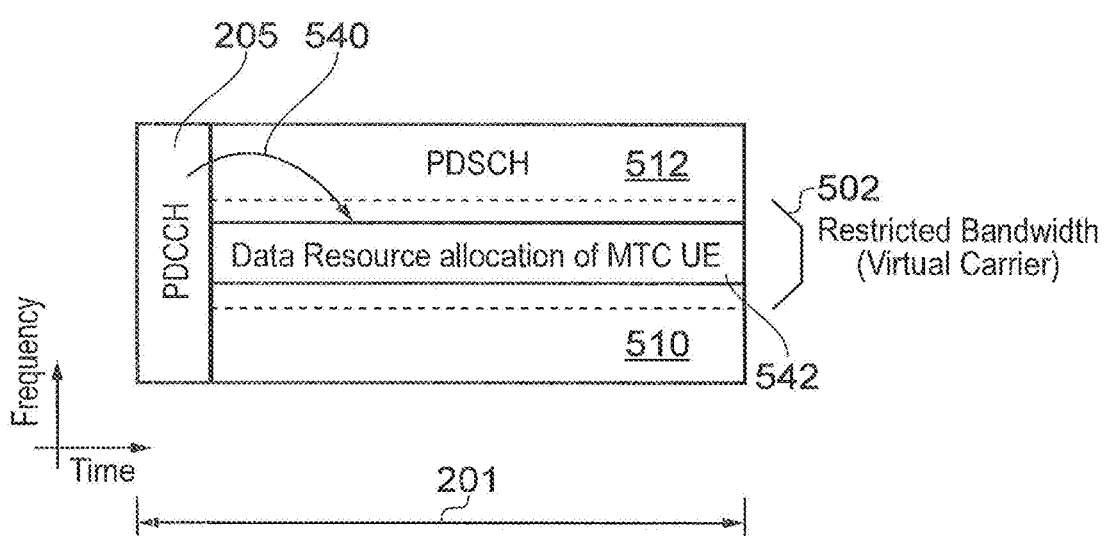
FIG. 6 provides a schematic diagram illustrating an example of an LTE downlink wireless access interface, which includes a previously proposed T-shaped virtual carrier in which resource allocation messages for allocating resources of the virtual carrier are transmitted within a host control channel.

FIG. 6 provides an example in which there is no dedicated virtual control region 520 such as that shown in FIG. 5 but the allocation of communications resources within a virtual carrier 502 is provided by communicating control messages via the conventional host control channel region 205. Thus as shown by arrow 540 a control channel message received from the PDCCH in the host control channel region 205 can allocate to an MTC type UE communications resources within the virtual carrier 502 across the sub-frame 201. Thus the communications resources of the shared channel in the darker shaded region 542 are allocated to one of the MTC UE's for receiving downlink communications. This arrangement is a so-called T shaped allocation of communications resources.

Improved Wireless Access Interface

According to the present technique one or more virtual radio access technology (RAT) interfaces is provided within a host wireless access interface in which different communications parameters are provided by the wireless access interface for transmitting and receiving signals. Accordingly, there can be a reserved subset of resources within a narrower bandwidth within the host bandwidth. The virtual RAT interface is configurable and may differ to both the host bandwidth and to a virtual carrier as described above in accordance with a number of communications parameters, including but not limited to the following:

TTI length
Sub-frame length
Physical resource block bandwidth
Resource element/resource block size
Modulation scheme
Subcarrier spacing
Symbol duration
Waveform (e.g. GDFMA, single carrier FDMA, OFDMA)

Example embodiments find application with a 5G system, in which a flexible and dynamic allocation of the communications resources of the wireless access interface can be provided, without precondition on an existing wireless access interface. However some of the aspects could feasibly be implemented using an LTE wireless access interface as described above such as for example a variable TTI length as explained below.

Figure 7:
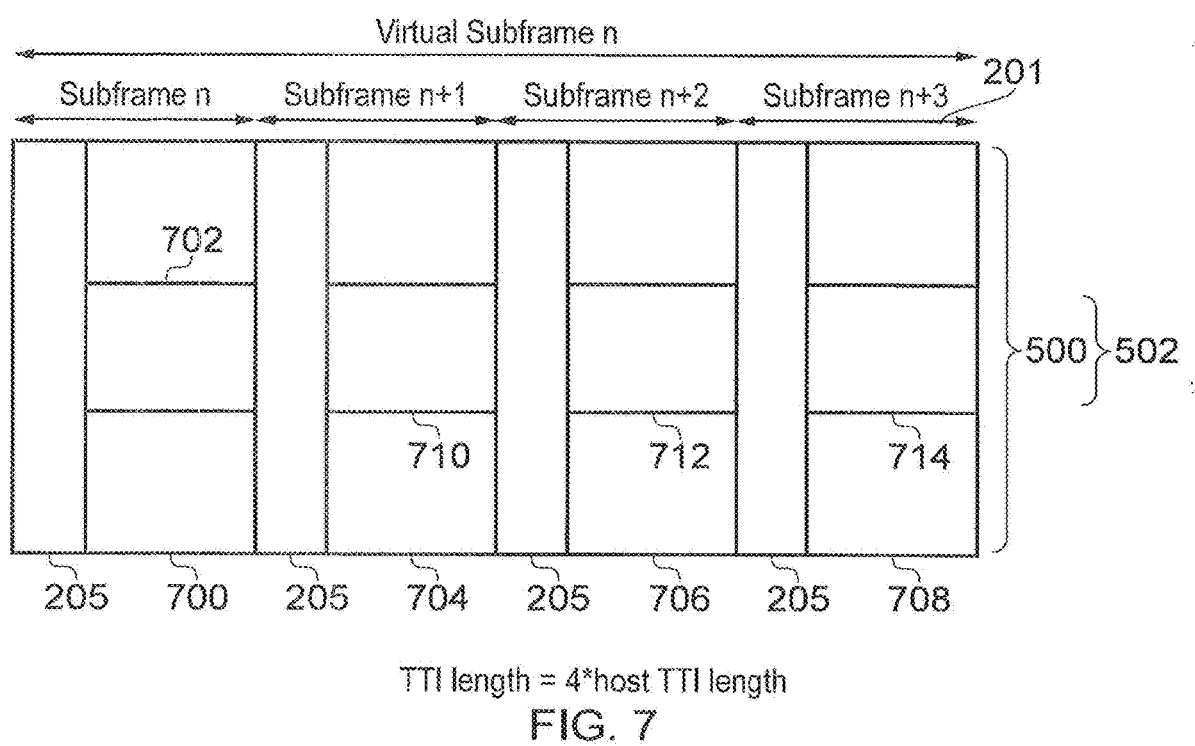
FIG. 7 provides a schematic diagram illustrating an example embodiment of the present technique in which a virtual sub-frame is formed from four sub-frames of a host wireless access interface.

According to the present technique there is provided an arrangement in which a mobile communications network provides a wireless access interface in which host communications resources are divided into a plurality of different regions which may provide communications resources in accordance with, for example, a different sub-frame structure and allocation of frequency resources which may provide for a different modulation scheme, a different waveform, or a different sub carrier spacing, modulation symbol duration. An example of such an arrangement is shown in FIG. 7. As shown in FIG. 7 the host wireless access interface comprises in accordance with the arrangement shown in FIGS. 5 and 6 a host control channel region 205 in each of 4 sub-frames 201. Also shown in FIG. 7 in correspondence with the arrangement shown in FIG. 6 a virtual RAT interface region is provided within a restricted bandwidth 502. However according to the present technique the arrangement shown in FIG. 7 provides a virtual RAT sub-frame structure comprising all four of the sub-frames of the host system. According to the present technique therefore, a first of the sub-frames 700 is used to transmit control messages within the virtual RAT interface region 702 for allocating the communications resources within the remaining sub-frames 704, 706, 708 within the virtual RAT interface region 710, 712, 714. According to this arrangement a sub-frame transmission basis then represents 4 times the sub-frame period of the host system. As such, the allocation of communications resources from the wireless access interface to particular types of devices is then performed over a longer period and would therefore suit applications which do not require a short latency. The more lenient latency requirement may allow for less complex devices to be designed.

As long as the TTI length is a multiple (2, 4, 8, etc) of the host TTI length, then it is quite simple for these different systems to co-exist within the same system. In the example above the virtual control region occupies the first host system sub-frame 702, and the data region occupies the following three sub-frames, 710, 712, 714, making the virtual sub-frame length of 4 ms (assuming 1 ms LTE TTI). This would allow for higher latency and lower complexity devices.

Figure 8:
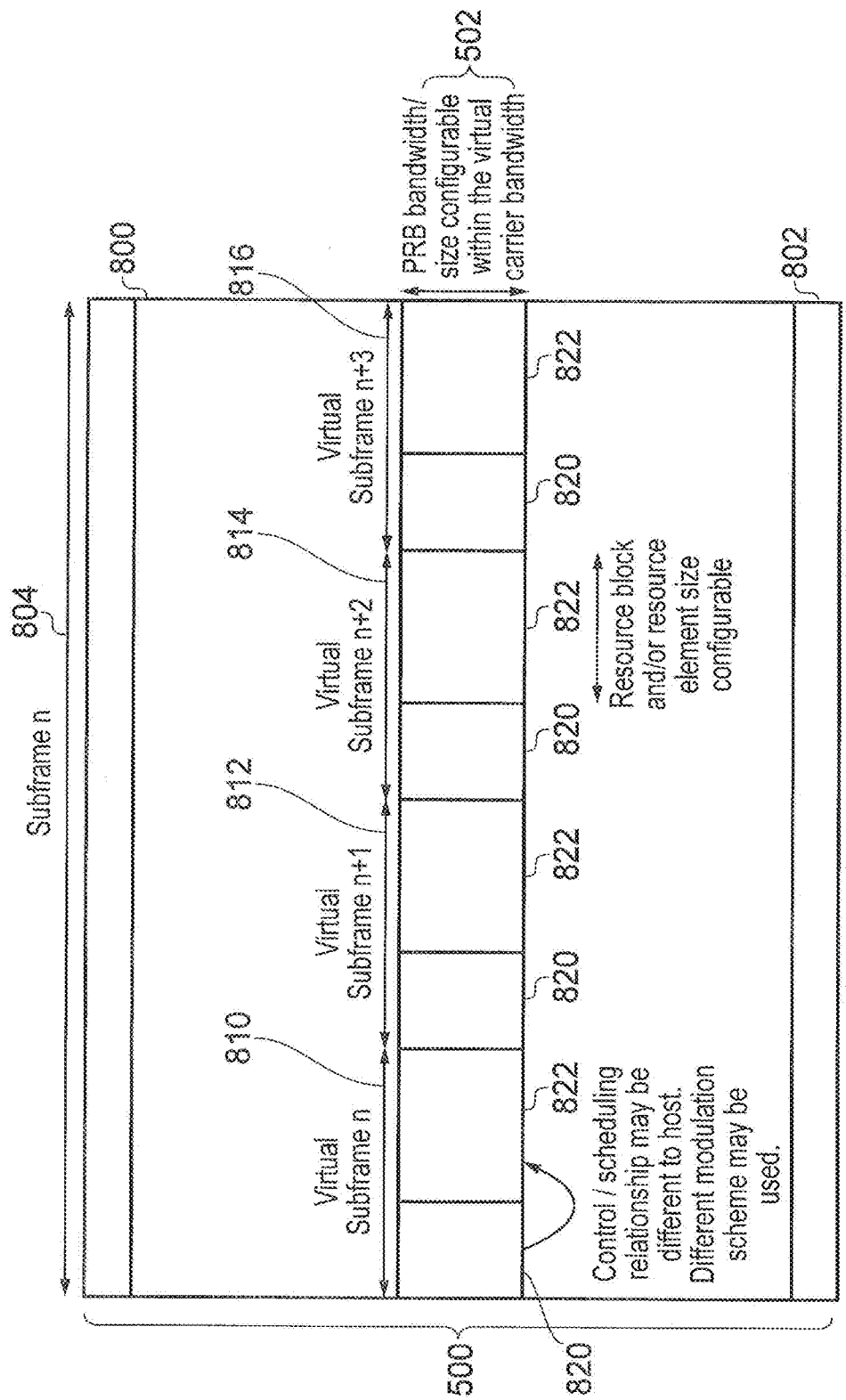
FIG. 8 provides a schematic diagram illustrating an example embodiment of the present technique in which an LTE downlink radio sub-frame is divided into an integer number of virtual sub-frames.

A corresponding arrangement in reverse is shown in FIG. 8, which uses a shorter TTI length within the host bandwidth/resources. According to the arrangement shown in FIG. 8, a host RAT interface bandwidth 500 is arranged to use enhanced physical downlink control channel regions (ePDCCH) 800, 802 spanning the length of the sub-frame in the highest and lowest frequency locations of the host RAT interface bandwidth 500, but in 5G there are other possibilities, for example to have control information in any physical resource location.

The arrangement shown in FIG. 8 comprises a single sub-frame 804 of the host wireless access interface. However, within a virtual RAT interface region of frequencies 502, the communications resources are divided into integer fractions to produce virtual sub-frames 810, 812, 814, 816. Within each of the virtual RAT sub-frames, the communications resources within the frequency bandwidth are divided into a virtual control region 820 and a shared data resource region 822, also termed a virtual data region. According to the present technique therefore control channel messages allocating communications resources within the virtual data region 822 are transmitted within the virtual control region 820 which allocate resources within the virtual sub-frames 810, 812, 814, 816. Accordingly, the allocation of communications resources within the virtual RAT interface region 502 is performed over a much shorter period being an integer fraction of the sub-frame duration of the host RAT interface. Accordingly, data can be transmitted to support services requiring a much shorter latency than is available from the host RAT interface.

The virtual control regions 820 of the virtual RAT 502 are shown as occupying the full bandwidth and a limited time duration of the virtual RAT. This is merely an example, and the virtual control region could instead have a different structure, such as an ePDCCH-like structure, whereby the virtual control region occupies a limited amount of frequency resource, but the full time duration of the virtual sub-frames 810, 812, 814, 816.

According to some embodiments, one or more control regions of the virtual RAT sub-frames can be used to indicate to the UEs where different waveforms are being applied in the host RAT interface. For example, virtual sub-frame n+3 816 (FIG. 8) could indicate which frequency resources are being used for a low latency waveform and which sub-frames are being used for a higher latency waveform in the following "m" host RAT interface sub-frames. If the UEs have this information, they do not have to attempt to decode frequency resources in sub-frames that have a non-compatible numerology, thereby saving battery resources and do not make unnecessary and meaningless measurements on frequencies with non-compatible numerologies.

When the virtual RAT interface TTI length is a multiple of the host RAT interface TTI length (or an integer fraction of the host RAT interface TTI length), the virtual RAT interface regions can be frequency hopped, allowing frequency diversity gain to be achieved. For example, if virtual RAT interface A has a TTI length of 4 times that of the host RAT interface (a higher latency VC) and if virtual RAT interface B has a TTI length of half that of the host RAT interface (a lower latency VC), then virtual RAT interfaces can be hopped every 4 sub-frames of the host RAT interface. In this case:

virtual RAT interface A would use the same frequency resources for 1 "virtual RAT interface A" TTI=4 host RAT interface TTIs and then hop;

virtual RAT interface B would use the same frequency resources for 8 "virtual RAT interface B" TTI=4 host RAT interface TTIs and then hop.

According to the present technique a subset of the physical resources are configured to be used with a different set of communications parameters, such as for example a different TTI/sub-frame length, a different physical resource element or resource block size, a different PRB bandwidth, a different subcarrier spacing, a different modulation symbol duration or a configuration of control/data channel structure may be different. For example, as shown in FIG. 8 the virtual RAT interface uses a control channel structure more similar to LTE PDCCH, while the host RAT interface uses a structure more similar to ePDCCH. In the case of 5G, a different waveform (e.g. Generalised Frequency Division Multiplexing, GFDM) could be used in the virtual RAT interface, allowing for higher spectral efficiency, shorter TTI, lower latency, etc. When a different waveform is used in the virtual RAT interface, a guard band may be inserted between the virtual RAT interface and the host RAT interface. This guard band may consist of a group of subcarriers to provide frequency isolation between the virtual RAT interface and the host RAT interface. The guard band may instead/in addition consist of an idle time between the virtual RAT interface region and the host RAT interface region, which is to provide some time domain isolation between the virtual RAT interface and host RAT interface, allowing inter-symbol interference between the virtual and host RAT interfaces to be controlled.

Figure 9:
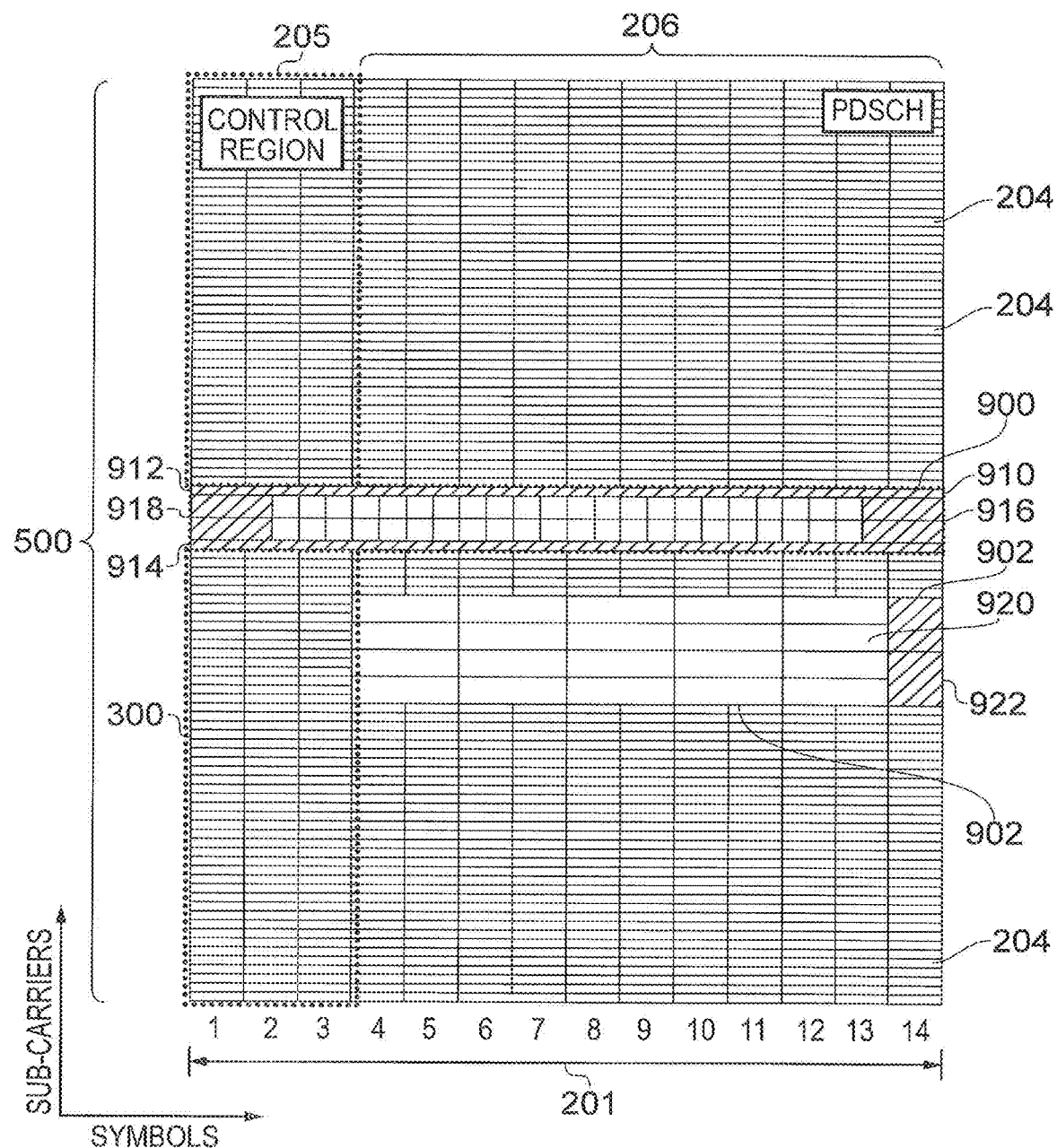
FIG. 9 is a schematic representation of a configuration of a host wireless access interface in accordance with an LTE Standard including within separate sections of the wireless access interface two different virtual RAT interfaces providing different communications parameters for serving different communications needs of different types of mobile communications devices.

FIG. 9 provides a further example embodiment of the present technique in which two different virtual RAT interfaces 900, 902 are provided within a host wireless access interface 500 configured in accordance with an LTE Standard as for the example illustrated in FIGS. 3, 7 and 8. As for the example illustration shown in FIG. 3, the resource elements 204 of the host wireless access interface 500 are divided into the PDCCH 205 and the PDSCH 206. However, as shown in FIG. 9, a first virtual RAT interface 900 is provided within the communications resources of the host wireless access system 500. A second virtual RAT interface is also provided 902. However the physical resource blocks of the first virtual RAT interface 900 are different to the physical resource blocks of the second virtual RAT interface 902. The first virtual RAT interface is provided across the entire sub-frame interval 201 and may comprise a different waveform and therefore a different configuration in time and frequency of the resource elements 910 which therefore have a different spacing with respect to the resource elements of the host wireless access interface. As shown in FIG. 9, the resource elements 910 of the first virtual RAT interface 900 have a shorter time duration and wider subcarrier spacing than the resource elements 204 of the host wireless access interface. Furthermore, the first virtual RAT interface includes a guard frequency band comprising higher frequencies 912 with respect to the virtual RAT interface resource elements 910 and a guard band comprising lower frequencies 914. There is also included a guard time of a duration comprising a non-integer multiple of the time duration of the resource elements of the host wireless access interface 916, 918. In contrast the second virtual RAT interface provides resource elements of a larger duration 920 and includes a time guard time 922.

Figure 10:
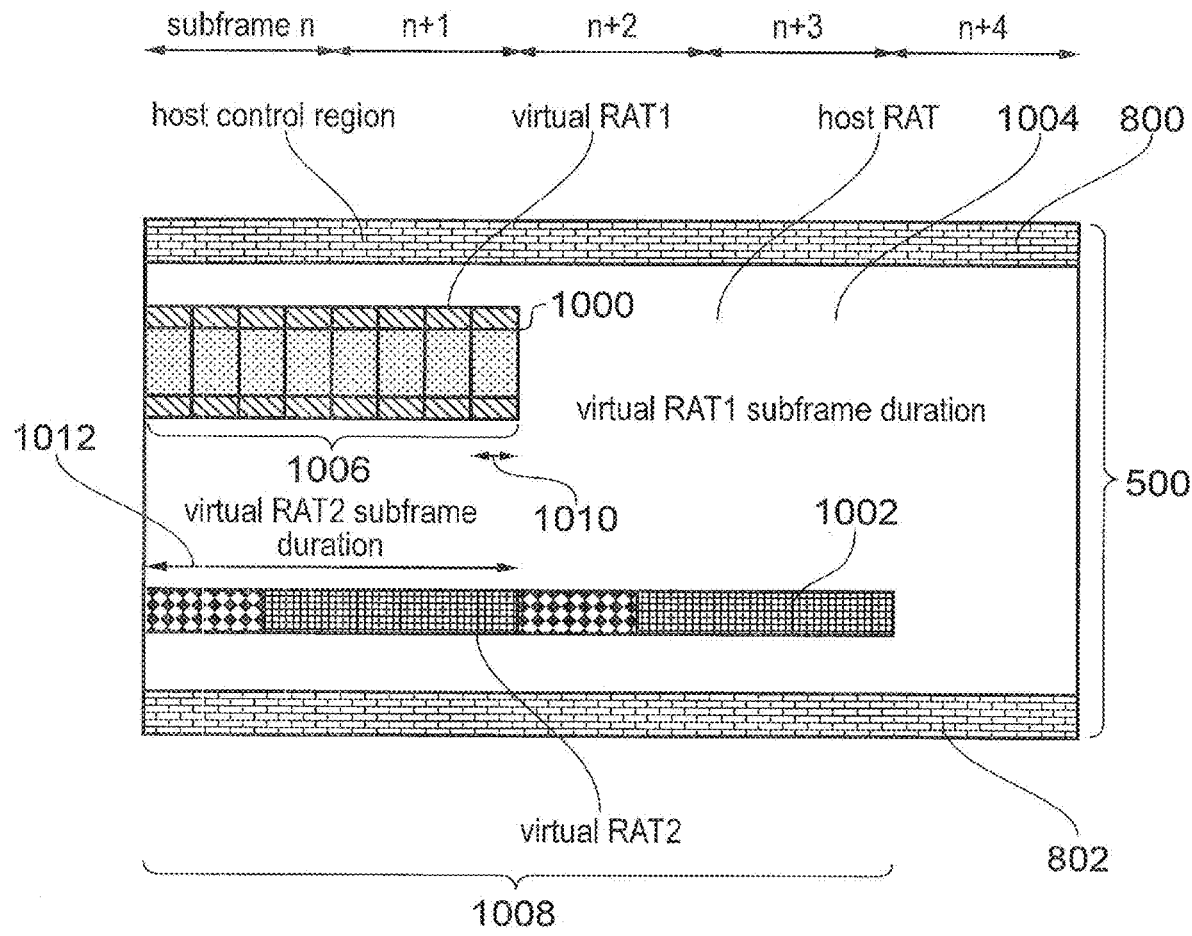
FIG. 10 is a schematic representation of another configuration of a host wireless access interface in accordance with an LTE Standard including within separate sections of the wireless access interface two different virtual RAT interfaces providing different communications parameters for serving different communications needs of different types of mobile communications devices.

FIG. 10 provides a further example embodiment of the present technique in which two different virtual RAT interfaces 1000, 1002 are provided within a host wireless access interface 500 configured in accordance with an LTE Standard as for the example illustrated in FIGS. 3, 7 and 8. As shown in FIG. 10, communications resource elements of the host wireless access interface 500 are divided into the shared resources 1004 and upper and lower host control channel regions 800, 802. However, as shown in FIG. 10, a first virtual RAT interface 1000 is provided within the communications resources of the host wireless access system 500. A second virtual RAT interface is also provided 1002. However the physical resource blocks of the first virtual RAT interface 1000 are different to the physical resource blocks of the second virtual RAT interface 1002. The first virtual RAT interface is provided in one section across two of sub-frame intervals 1006 and may comprise a different waveform and therefore a different configuration in time and frequency of the resource elements, which therefore have a different spacing, with respect to the resource elements of the host wireless access interface. The first virtual RAT may also have a much shorter virtual RAT sub-frame duration 1010.

FIG. 10 therefore provides an illustration of different communications parameters provided within different virtual RAT interfaces within a host wireless access interface. FIG. 10 therefore illustrates that according to the present technique, different sized resource elements and physical resource blocks can be provided for different applications. FIG. 10 therefore illustrates the following aspects:

A host RAT interface 500, which (even though it is a 5G carrier) might have an LTE Release-12-like structure and numerology (including subcarrier spacing, symbol duration, number of symbols per subframe, cyclic prefix duration, etc.)

The host RAT interface 500 shown has an ePDCCH-like structure for the control channels 800, 802

The host RAT interface has a 1 ms subframe duration, consisting of 14 OFDM symbols, with a subcarrier spacing of 15 kHz The Virtual RAT1 1000 (e.g. a low latency, high data rate virtual RAT), has the following features:

Subframe duration 0.25 ms (25% that of the host RAT)

Signal structure is GFDM subcarrier spacing=60 kHz

GFDM symbol duration=LTE symbol duration divided by four

Only allocated in subframes 'n' and 'n+1' of the illustrated host RAT's subframe structure The Virtual RAT2 1002 (e.g. a higher latency, long range coverage virtual RAT for MTC applications) has the following features:

Subframe duration is 2 ms (200% that of the host RAT)

Signal structure consists of multiple narrowband carriers (filter multibank)

Narrowband carrier spacing=1 kHz

GMSK modulation

Longer symbol duration than host RAT

Different control channel structure to the host RAT. Virtual RAT2 uses a time division control channel structure (in the same way that the PDCCH is a time domain control channel structure)

Only allocated in some subframes of the host RAT

When the virtual RATs are not active, resources can be used by the host RAT

As illustrated above, within the host bandwidth, a number of different virtual RAT interfaces could co-exist, each with different parameterisation for use with different types of service. For example a long TTI with low data rate for MTC devices, an intermediate TTI with an average latency and throughput for smartphones, and a short TTI with low latency for time-critical applications such as tactile internet devices or virtual reality headsets. Different virtual RAT interfaces could potentially be provided by different network nodes, for example a virtual RAT interface for use with a femto cell could share the same physical spectrum as the macro cell.

There are various options for configuration, ranging from use of fixed configurations, broadcast configurations, and configurations signalled individually to a device, while the overall resource management is done in the network.

Various modifications can be made to examples of the present disclosure.

Various further aspects and features of the present invention are defined in the following numbered clauses:

REFERENCES

[1] LTE for UMTS: OFDMA and SC-FDMA Based Radio Access, Harris Holma and Antti Toskala, Wiley 2009, ISBN 978-0-470-99401-6.

[2] 4G Americas, "4G Americas' Recommendations on 5G Requirements and Solutions," October 2014.

[3] Ericsson, "Ericsson Mobility Report on the Pulse of the Networked Society," November 2014.

Annex 1

As shown in FIG. 4, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signaling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

Embodiments of the disclosure may be generally described in the following numbered paragraphs.

Paragraph 1. A communications device for transmitting data to or receiving data from a wireless communications network, the communications device comprising:

a transmitter configured to transmit signals to one or more infrastructure equipment of the wireless communications network via a wireless access interface, a receiver configured to receive signals from one or more of the infrastructure equipment of the wireless communications network via the wireless access interface, and a controller configured to control the transmitter and the receiver to transmit the signals and to receiver the signals via the wireless access interface, wherein the wireless access interface provides communications resources arranged in time divided units of a host radio access technology, RAT, frequency bandwidth, the time divided units and the host RAT interface frequency bandwidth being arranged into one or more virtual RAT interfaces, and the receiver is configured to receive the signals being transmitted via one of the virtual RAT interfaces in accordance with different communications parameters from the host RAT interface providing different characteristics for communicating data represented by the signals with respect to a characteristic of signals transmitted according to communications parameters in the communications resources of the host RAT interface.

Paragraph 2. A communications device as claimed in paragraph 1, wherein the time divided units of the host RAT interface are time frames, each time frame comprising a plurality of sub-frames, and one of the virtual RAT interfaces comprises communications resources within a virtual RAT interface bandwidth, which is less than the host RAT interface bandwidth, and the virtual RAT interface bandwidth is divided into a plurality of time divided frames, each frame including a plurality of sub-frames, the receiver being configured with the controller to receive from the one or more infrastructure equipment an allocation of the communications resources of the shared channel, and each of the sub-frames of the virtual RAT interface comprises a plurality of the sub-frames of the host RAT interface within the virtual RAT interface bandwidth, the sub-frame of the virtual RAT interface is longer than the sub-frame of the host RAT interface so that a communications parameter defining a time for receiving data from the one or more infrastructure equipment is longer than for the host RAT interface.

Paragraph 3. A communications channel as claimed in paragraph 2, wherein the sub-frame of the virtual RAT interface is equal to m sub-frames of the host RAT interface.

Paragraph 4. A communications device as claimed in paragraph 2 or 3, wherein each of the sub-frames of the virtual RAT interface includes a control channel region and a shared channel region, the control channel region has a temporal length equal to at least one of the sub-frames of the host RAT interface and the shared channel region has a temporal length equal to a plurality of the sub-frames of the host RAT interface.

Paragraph 5. A communications device as claimed in paragraph 1, wherein the time divided units of the host RAT interface are time frames, each time frame comprising a plurality of sub-frames, and one of the virtual RAT interfaces comprises communications resources within a virtual RAT interface bandwidth, which is less than the host RAT interface bandwidth, and the virtual RAT interface bandwidth is divided into a plurality of time divided frames, each frame including a plurality of sub-frames, and a temporal length of each of the sub-frames of the virtual RAT interface is arranged so that a temporal length of each of the sub-frames of the host RAT interface is equal to a plurality of the sub-frames of the virtual RAT interface, the sub-frame of the virtual RAT interface being shorter than the sub-frame of the host RAT interface so that a communications parameter defining a time for receiving data from the one or more infrastructure equipment is shorter than for the host RAT interface.

Paragraph 6. A communications channel as claimed in paragraph 1, wherein the sub-frame of the virtual RAT interface is equal to an integer fraction 1/m of the temporal length of the host RAT interface, m being an integer.

Paragraph 7. A communications device as claimed in paragraph 5 or 6, wherein each of the sub-frames includes a control channel region and a shared channel region, and the receiver is configured with the controller to receive the control channel messages from the one or more infrastructure equipment providing an allocation of the communications resources of the shared channel, the control channel region and the shared channel region have a temporal length which is less than one of the sub-frames of the host RAT interface.

Paragraph 8. A communications device as claimed in any of paragraphs 1 to 7, wherein one of the communications parameters is a waveform of the signals which is used to transmit the data via a virtual RAT interface, and one of the virtual RAT interfaces is arranged with a different waveform to a waveform which is used to transmit the signals on the host RAT interface frequency resources.

Paragraph 9. A communications device as claimed in any of paragraphs 1 to 7, wherein one of the communications parameters is a configuration of a physical resource element in time or frequency, which is used to transmit the data via a virtual RAT interface, and one of the virtual RAT interfaces is configured with a differently dimensioned physical resource element in time or frequency to the dimensions of the physical resource elements of the host RAT interface.

Paragraph 10. A communications device as claimed in paragraph 8 or 9, wherein the virtual RAT interface includes a guard band comprising communications resources in the frequency domain of the host RAT interface in which signals of neither the host RAT interface nor the virtual RAT interface are transmitted, wherein signals received within the communications resources of the guard band may be discarded.

Paragraph 11. A communications device as claimed in paragraph 8 or 9, wherein the virtual RAT interface includes a guard time comprising communications resources of the host RAT interface in the time domain in which signals of neither the host RAT interface nor the virtual RAT interface are transmitted, wherein signals received within the communications resources of the guard band may be discarded.

Paragraph 12. A communications device as claimed in any of paragraphs 1 to 11, wherein the communications parameters of the virtual RAT interface are configured dynamically, and the receiver in combination with the controller is configured to receive an indication of the communications resources of the virtual RAT interface.

Paragraph 13. A communications device for transmitting data to or receiving data from a mobile communications network, the communications device comprising:

a transmitter configured to transmit signals to one or more infrastructure equipment of the wireless communications network via a wireless access interface, a receiver configured to receive signals from one or more of the infrastructure equipment of the wireless communications network via the wireless access interface, and a controller configured to control the transmitter and the receiver to transmit the signals and to receive the signals via the wireless access interface, wherein the wireless access interface is configured to allocate physical communications resources to provide different radio access techniques to different types of devices, the different radio access techniques providing different virtual RAT interfaces comprising different communications parameters for different types of communications for different communications devices.

Paragraph 14. An infrastructure equipment for transmitting data to communications devices or receiving data from communications devices within a wireless communications network, the infrastructure equipment comprising:
a transmitter configured to transmit signals to one or more of the communications devices via a wireless access interface,
a receiver configured to receive signals from the one or more of the communications devices via the wireless access interface, and
a controller configured to control the transmitter and the receiver to transmit the signals and to receive the signals via the wireless access interface, wherein the controller is configure to control the transmitter to form the wireless access interface providing communications resources arranged in time divided units of a host radio access technology, RAT, interface frequency bandwidth, the time divided units and the host RAT interface frequency bandwidth being arranged into one or more virtual RAT interfaces, and the transmitter is configured to transmit the signals via one of the virtual RAT interfaces in accordance with different communications parameters from the host RAT interface providing different characteristics for communicating data represented by the signals with respect to a characteristic of signals transmitted according to communications parameters in the communications resources of the host RAT interface for communicating data in accordance with different characteristics to those of the host RAT interface.

Paragraph 15. A method of communicating data to a communications device via a wireless communications network, the method comprising:
receiving signals from one or more of the infrastructure equipment of the wireless communications network via the wireless access interface, the wireless access interface providing communications resources arranged in time divided units of a host radio access technology, RAT, frequency bandwidth, the time divided units and the host RAT interface frequency bandwidth being arranged into one or more virtual RAT interfaces, and the receiving comprises
selecting one of the virtual RAT interfaces, and
receiving the signals transmitted via the virtual RAT interface in accordance with different communications parameters from the host RAT interface providing different characteristics for communicating data represented by the signals with respect to a characteristic of signals transmitted according to communications parameters in the communications resources of the host RAT interface.

Paragraph 16. A method of communicating data to one or more communications devices from an infrastructure equipment of a wireless communications network, the method comprising
transmitting signals to one or more of the communications devices via a wireless access interface, the wireless access interface providing communications resources arranged in time divided units of a host radio access technology, RAT, frequency bandwidth, the time divided units and the host RAT interface frequency bandwidth being arranged into one or more virtual RAT interfaces, and the transmitting includes
transmitting signals via one or more of the virtual RAT interfaces to one or more of the communications devices in accordance with different communications parameters from the host RAT interface providing different characteristics for communicating data represented by the signals with respect to a characteristic of signals transmitted according to communications parameters in the communications resources of the host RAT interface for communicating data in accordance with different characteristics to those of the host RAT interface.

The invention claimed is:

1. An infrastructure equipment for transmitting data to communications devices within a wireless communications network, the infrastructure equipment comprising:
a controller configured to
transmit signals via a first interface, wherein the first interface provides first communications resources arranged in time divided units having a first bandwidth and a first subcarrier spacing, and
transmit signals via a second interface in accordance with different communications parameters from the first interface providing different characteristics for communicating data represented by the signals, wherein
the second interface provides second communication resources having a narrower bandwidth than the first bandwidth and a second subcarrier spacing, different from the first subcarrier spacing.

2. The infrastructure equipment of claim 1, wherein the at least one of the one or more second interfaces comprises communications resources within a second bandwidth, which is less than the first bandwidth.

3. The infrastructure equipment of claim 1, wherein at least one of the one or more second interfaces has a wider subcarrier spacing than the first subcarrier spacing.

4. The infrastructure equipment of claim 1, wherein at least one of the one or more second interfaces has a narrower subcarrier spacing than the first subcarrier spacing.

5. The infrastructure equipment of claim 1, wherein subcarrier allocations are contiguous.

6. The infrastructure equipment of claim 1, wherein
the time divided units of the first interface are time frames, each time frame comprising a plurality of first slots,
the at least one of the one or more second interfaces is divided into a plurality of time divided frames, each time divided frame including a plurality of second slots, and
a length of a slot decreases as a subcarrier spacing increases.

7. The infrastructure equipment of claim 6, wherein
a first length of each of the first slots of the first interface is equal to a plurality at least two second slots of the at least one of the one or more second interfaces, so that a communications parameter defining a time for receiving data is shorter than for the first interface.

8. The infrastructure equipment of claim 6, wherein
a second length of each of the plurality of second slots is equal to an integer fraction 1/m of a first length, m being an integer.

9. The infrastructure equipment of claim 6, wherein
each of the second slots includes a control channel region and a shared channel region, and the control channel region and the shared channel region have a length which is less than one of the plurality of first slots.

10. The infrastructure equipment of claim 1, wherein
one of the communications parameters is a waveform of the signals which is used to transmit the data via at least one of the second interfaces, and
the at least one of the one or more second interfaces is arranged with a different waveform to a waveform which is used to transmit the signals on the first interface.

11. The infrastructure equipment as claimed in claim 1, wherein
one of the communications parameters is a configuration of a physical resource element in time or frequency, which is used to transmit the data via at least one of the one or more the second interfaces, and
the one of the second interfaces is configured with a differently dimensioned physical resource element in time or frequency to dimensions of physical resource elements of the first interface.

12. The infrastructure equipment of claim 1, wherein
the at least one of the second interfaces includes a guard band comprising communications resources in a frequency domain of the first interface in which signals of neither the first interface nor the at least one of the second interfaces are transmitted.

13. The communications device as claimed in claim 11, wherein
the at least one of the second interfaces includes a guard time comprising communications resources of the first interface in a time domain in which signals of neither the first interface nor the at least one second interface are transmitted.

14. The communications device of claim 1, wherein
the communications parameters of the second interfaces are configured dynamically.

15. A method performed by an infrastructure equipment for transmitting data to communications devices within a wireless communications network, the method comprising:
transmitting signals via a first interface, wherein the first interface provides first communications resources arranged in time divided units having a first bandwidth and a first subcarrier spacing, and
transmitting signals via a second interface in accordance with different communications parameters from the first interface providing different characteristics for communicating data represented by the signals,
wherein the second interface provides second communication resources having a narrower bandwidth than the first bandwidth and a second subcarrier spacing, different from the first subcarrier spacing.

16. The method of claim 15, wherein
the at least one of the one or more second interfaces comprises communications resources within a second bandwidth, which is less than the first bandwidth.

17. The method of claim 15, wherein at least one of the one or more second interfaces has a wider subcarrier spacing than the first subcarrier spacing.

18. The method of claim 15, wherein at least one of the one or more second interfaces has a narrower subcarrier spacing than the first subcarrier spacing.

19. The method of claim 15, wherein
the communications parameters of the second interfaces are configured dynamically.

20. The method of claim 14, wherein subcarrier allocations are contiguous.

* * * * *